(12) United States Patent
Fakhari et al.

(10) Patent No.: US 8,931,670 B2
(45) Date of Patent: Jan. 13, 2015

(54) UTILITY COMPARTMENT TRAY AND MOUNTING BRACKET ASSEMBLY

(71) Applicant: ALF Operating Partner LP, Fort Worth, TX (US)

(72) Inventors: John Fakhari, Fort Worth, TX (US); Lee Finley, Fort Worth, TX (US)

(73) Assignee: ALF Operating Partner LP, Fort Worth, TX (US)

( * ) Notice: Subject to any disclaimer, the term of this patent is extended or adjusted under 35 U.S.C. 154(b) by 0 days.

(21) Appl. No.: 13/781,322

(22) Filed: Feb. 28, 2013

(65) Prior Publication Data

US 2014/0239028 A1 Aug. 28, 2014

(51) Int. Cl.
*B60R 9/00* (2006.01)

(52) U.S. Cl.
USPC ............................ 224/404; 224/405; 224/402

(58) Field of Classification Search
CPC ............ B60R 11/00; B60R 9/00; B60R 9/055
USPC .......................................... 224/404, 405, 402
See application file for complete search history.

(56) References Cited

U.S. PATENT DOCUMENTS

| | | | |
|---|---|---|---|
| 1,808,475 A | 6/1931 | Oyen | |
| 2,020,373 A | 11/1935 | Petzold, Jr. | |
| 2,701,027 A | 2/1955 | Scoville | |
| 2,728,480 A | 12/1955 | Close | |
| 2,985,333 A | 5/1961 | Kirkman | |
| 3,273,952 A | 9/1966 | Himelreich et al. | |
| 3,656,650 A | 4/1972 | Frater | |
| 3,856,137 A | 12/1974 | Brindley | |
| 4,288,011 A * | 9/1981 | Grossman | 224/404 |
| 4,372,568 A * | 2/1983 | Campbell | 280/63 |
| 4,436,215 A | 3/1984 | Kleinert et al. | |
| 4,446,982 A | 5/1984 | Corse | |
| 4,469,364 A * | 9/1984 | Rafi-Zadeh | 296/37.6 |
| 4,593,816 A | 6/1986 | Langenbeck | |
| 4,595,098 A | 6/1986 | Kryter | |
| 4,705,317 A * | 11/1987 | Henri | 296/37.6 |
| 4,708,453 A | 11/1987 | Fryda et al. | |
| 4,722,453 A | 2/1988 | Hamilton | |
| 4,768,661 A | 9/1988 | Pfeifer | |
| 4,830,242 A * | 5/1989 | Painter | 224/42.32 |
| 5,094,375 A * | 3/1992 | Wright | 224/404 |
| 5,201,414 A | 4/1993 | Kaszubinski | |
| 5,265,729 A | 11/1993 | Carlin | |
| 5,269,447 A | 12/1993 | Gower et al. | |
| 5,299,704 A * | 4/1994 | Thorby | 220/6 |

(Continued)

OTHER PUBLICATIONS

Photo of tray disclosed in U.S. Patent No. 6,443,544 and shown mounted within a compartment of a utility vehicle believed to have been on sale more than one year prior to the filing date of the present application.

*Primary Examiner* — Brian D Nash

(74) *Attorney, Agent, or Firm* — Erickson Kernell Derusseau & Kleypas, LLC

(57) ABSTRACT

A tray for mounting between walls in which the bottom and sidewalls of the tray body are formed as an integral piece using a pultrusion process. Electrical conductors may be embedded into the tray body to permit attachment and electrical coupling of lights and other electrical apparatus thereto. Slots formed in ridges which are intergrally formed on the bottom of the tray are aligned with slots formed in ribs formed integrally along an inner surface of the tray sidewalls. A tray divider is selectively securable in aligned slots in the ridges and ribs and held in place with a clip.

14 Claims, 5 Drawing Sheets

(56) References Cited

U.S. PATENT DOCUMENTS

| | | | |
|---|---|---|---|
| 5,381,940 A * | 1/1995 | Wright | 224/542 |
| 5,456,357 A * | 10/1995 | Wenner et al. | 206/372 |
| 5,459,648 A * | 10/1995 | Courtney | 362/154 |
| 5,597,193 A * | 1/1997 | Conner | 296/37.6 |
| 5,601,206 A * | 2/1997 | Haas et al. | 220/527 |
| 6,142,549 A * | 11/2000 | Clare et al. | 296/37.6 |
| 6,443,544 B1 | 9/2002 | Wolf et al. | |
| 6,588,732 B1 | 7/2003 | Caceres et al. | |
| 6,871,921 B2 | 3/2005 | Ernst | |
| 6,886,693 B1 | 5/2005 | Davenport et al. | |
| 7,322,564 B2 | 1/2008 | Fakhari | |
| 7,810,277 B2 | 10/2010 | Fakhari | |
| 8,354,048 B2 | 1/2013 | Caceres et al. | |
| 2002/0014505 A1 * | 2/2002 | Lance et al. | 224/404 |
| 2006/0151585 A1 | 7/2006 | Misjak | |
| 2007/0246471 A1 | 10/2007 | Hrovat | |
| 2007/0273258 A1 | 11/2007 | Ernst | |
| 2008/0128428 A1 | 6/2008 | Beckerman | |
| 2009/0057305 A1 | 3/2009 | Moreau | |

* cited by examiner

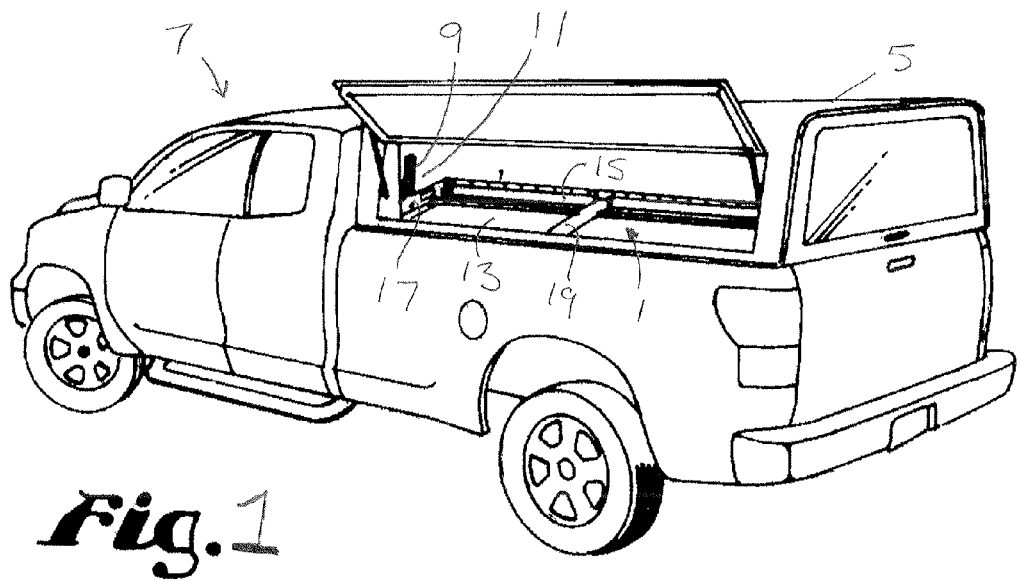
Fig. 1
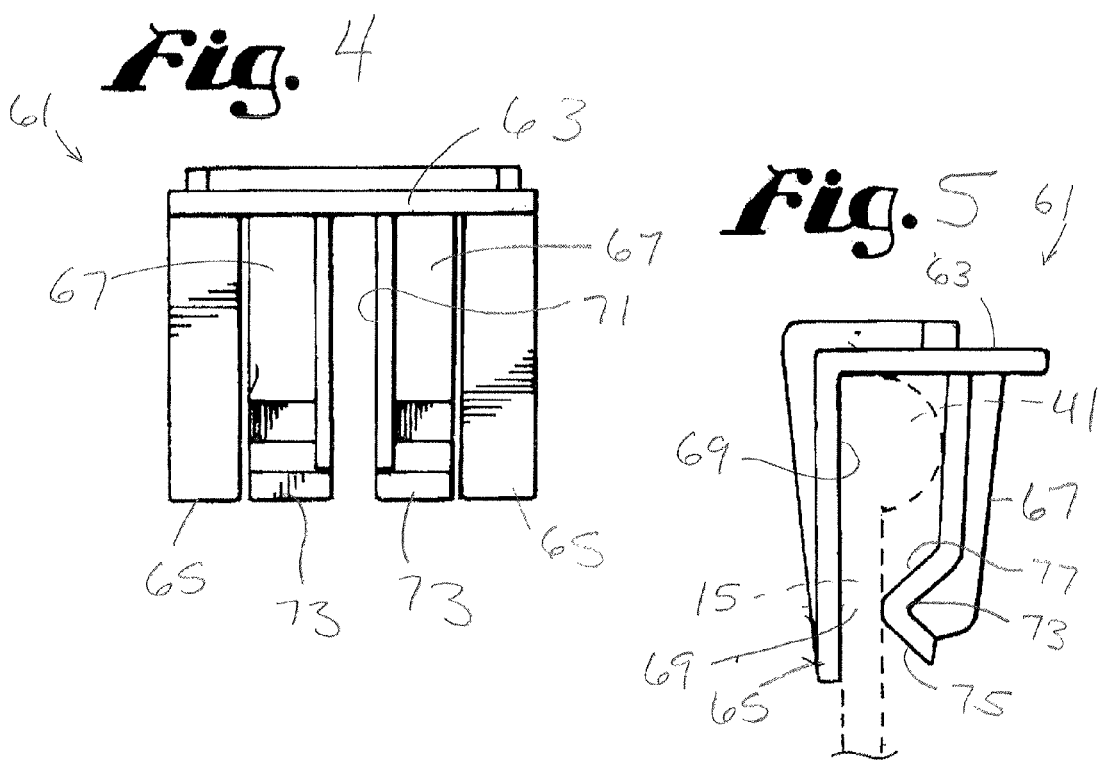
Fig. 4
Fig. 5

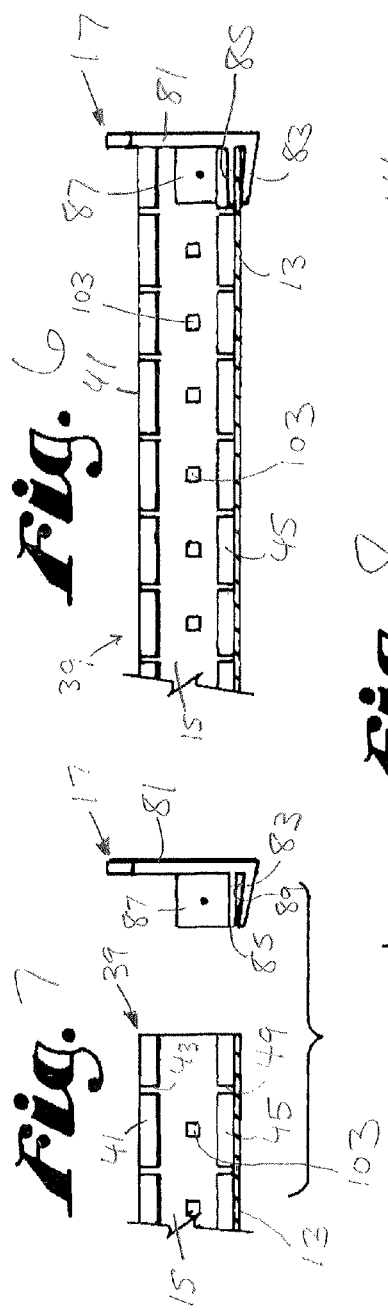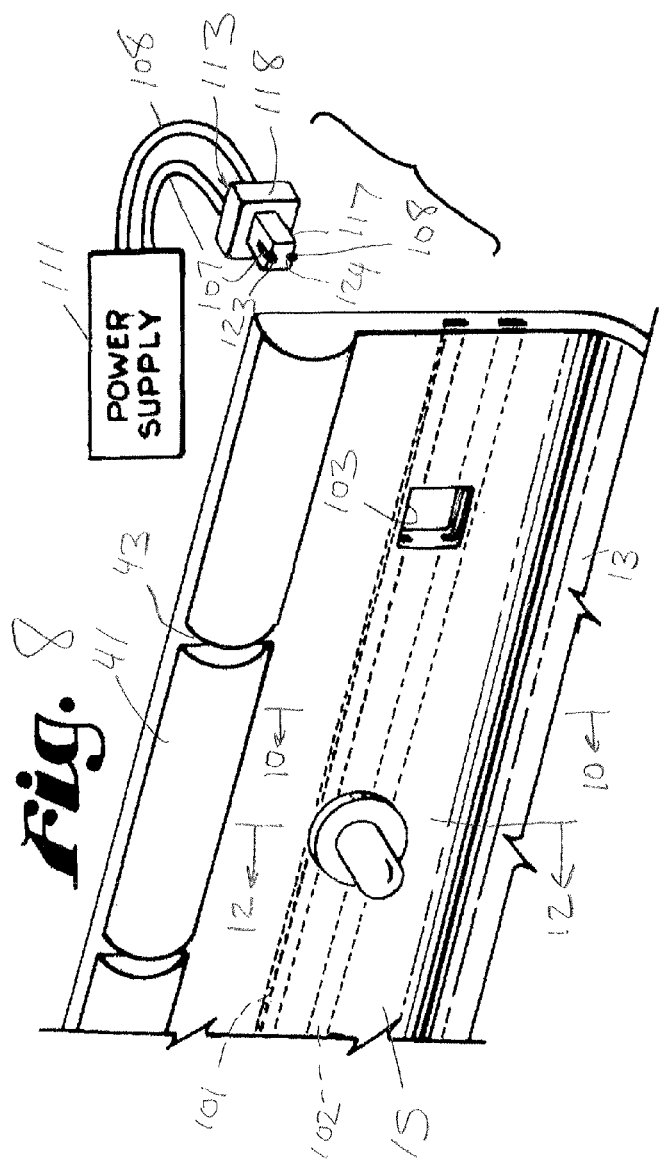

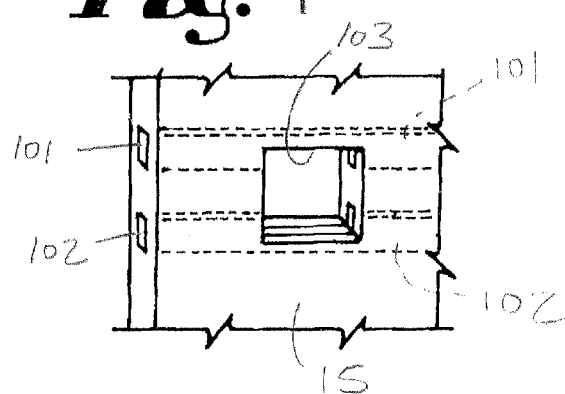
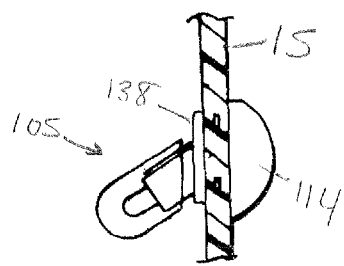
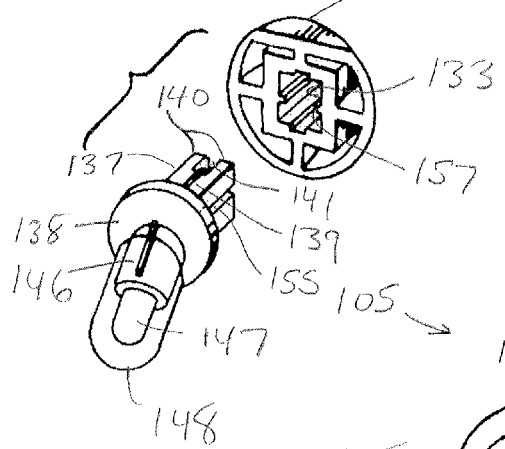
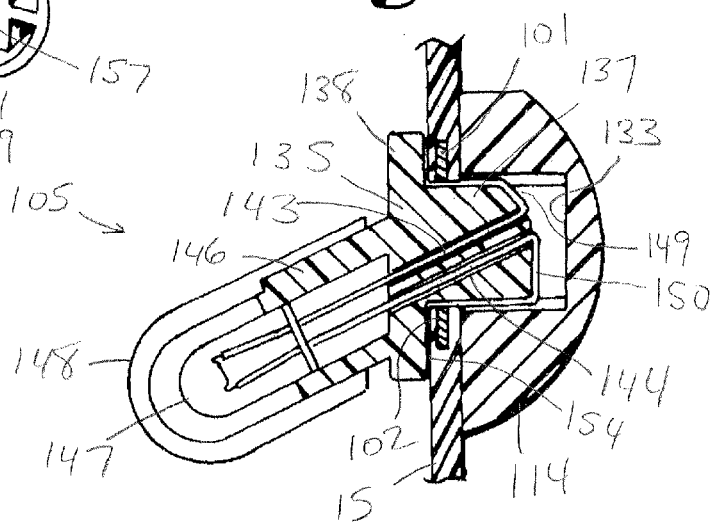

UTILITY COMPARTMENT TRAY AND MOUNTING BRACKET ASSEMBLY

BACKGROUND OF THE INVENTION

1. Field of the Invention

This invention relates to wall-mounted trays. More specifically, trays for use with utility type vehicles or other vehicles having utility compartments.

2. Background & Description of the Related Art

Companies often need to provide services to customers at locations away from the company's office or permanent place of business. Therefore it is common for companies to send technicians on service calls to provide on-site services at the location where they are required. During these service calls, a technician usually requires certain tools or materials to perform the service, and these items are generally transported to the site by the technician. One method for transporting such items is by putting the items in a storage compartment, or utility compartment, attached to the vehicle that is driven to the service site.

Utility compartments are robust easily accessible storage compartments for storing and retrieving tools and other materials regularly used by technicians during service calls. These compartments are commonly retrofitted onto motor vehicles such as trucks in the form of a truck bed topper or side accessory for a flat bed.

If a technician anticipates needing access to many tools, or tools that are too large to fit in a regular utility compartment, the technician may drive a utility vehicle to the site. Utility vehicles are typically truck or van type motor vehicles comprising multiple utility compartments and other larger storage spaces. Utility vehicles are designed to maximize the amount of storage space on the vehicle and at the same time allow transportation of larger, heavier tools that may not be suitably transported by other vehicles. Utility vehicles often carry most, if not all, of the tools and materials that would be found in a permanent workshop.

Utility compartments, whether retrofitted onto a truck or a permanent feature in a utility vehicle, often have shelving or wall mounted trays for organizing items within the compartment. Some of these trays are fixed within the utility compartment and others slide out like drawers. Traditionally, these trays were made from metal to provide the strength and durability necessary for holding relatively heavy tools. However, the aggregate weight of metal trays on a vehicle can significantly impact the vehicle's gas mileage and longevity of its suspension system. As a result, companies have recently started constructing utility compartment trays of lighter yet sufficiently durable materials such as plastic and fiberglass.

U.S. Pat. No. 6,443,544 to Wolf et al. discloses a slidable drawer for a utility vehicle. Wolf states that the drawer can be constructed from any conventional plastic material, however fiberglass is preferred. A problem with the Wolf drawer is that it is constructed of multiple individual pieces thus making assembly tedious and expensive. Also, because the drawer has several pieces, fasteners are required at each point of connection between the pieces. Each fastener installation becomes an opportunity for a manufacturing defect, and each installed fastener is a possible failure point when the tray is in use (e.g., the rusting through of a rivet securing an end piece of the drawer could lead to the end piece separating from the rest of the drawer). Therefore, what is needed in the industry is a utility compartment tray made of lightweight material such as plastic or fiberglass that has fewer individual pieces to assemble.

Some utility compartment trays feature moveable partitions or dividers configurable to create custom sub-compartments in the tray. These sub-compartments can be configured as necessary based on the sizes, shapes and quantities of the items stored in the tray.

The '544 patent to Wolf discloses moveable dividers receivable in vertical slots formed on the side members of the drawer. The side members comprise a pair of inwardly extending spaced upper and lower bars with the slots formed therein. Wolf's divider system has a couple of weaknesses. First, the dividers are only secured at the interior edges of the drawer, thus leaving the dividers unsecured for length of their span across the drawer. This makes them susceptible to flexing and breakage due to drawer contents pressing laterally against them. Also, Wolf's divider system suffers from the fact that the drawer is made from several pieces. Because the side members are separately assembled pieces, it is possible that corresponding opposing divider slots are misaligned when the drawer is assembled. This would result in poorly fitting and less effective dividers.

U.S. Pat. No. 5,381,940 to Wright discloses a tray for organizing articles in a vehicle. The tray in Wright is directed to primarily to noncommercial use such as organizing items in the trunk of a family automobile. Wright's tray has a plurality of ribs extending across the tray in which dividers can be seated. The ribs are closely spaced adjacent one another and the plurality of ribs encompass the entire bottom of the tray. Consequently, there is little to no flat surface available on the bottom interior of the tray. Because the dividers rest lengthwise between the ribs, the ribs help prevent flexing of the dividers as they span the tray. However, the fact that the ribs span the entire width of the tray and cover the entire bottom of the tray make such a design undesirable for most trays used in commercial utility compartments. The ribs create valleys where screws, bolts, wiring and other small items can fall making it harder for a technician to quickly find and grab these small items.

What is needed is a utility compartment tray divider system that secures dividers along their span across the tray, while allowing the tray to have a substantially flat interior surface.

SUMMARY OF THE INVENTION

The present invention is directed to a storage tray that is adapted to be mounted between two walls and is particularly well adapted for use in a storage compartment of a utility vehicle. The tray includes a body having a bottom and at least two sidewalls integrally formed with the bottom which is generally flat. At least one ridge is integrally formed with and extends upwardly from the bottom and in parallel relation to and between the sidewalls. A bottom edge of a partition for partitioning the interior compartment is receivable in one of a plurality of slots formed in the ridge. Sides of the partition are inserted in slots formed in ribs extending along the inner surface of the sidewalls. The slots in the sidewall rib are aligned with the slots in the ridge on the bottom of the tray.

The tray may be supported on at least two brackets mounted on parallel walls. End caps secured across opposite ends of the body of the tray are securable to the brackets. Each bracket includes a plurality of threaded receivers mounted therein for receiving a threaded fastener extending through a respective end wall of the tray and into the bracket to permit positioning of said tray at vertically selectable levels. Each end cap may include an upper bolt hole extending therethrough and a plurality of lower bolt holes extending therethrough below and in equally spaced relation from the upper bolt hole. The spacing between the upper bolt hole relative to the lower bolt holes corresponds to the spacing between adjacent threaded receivers in the brackets which permits the tray to be secured in place at an angle relative to the brackets by inserting a bolt through one of the lower holes offset from the upper hole at an angle relative to a vertical axis of the bracket.

The tray may be formed with a pair of electrical conductors embedded in and extending the length of the tray body either along the sides or the bottom or both. Selected electrical apparatus such as lights and a power supply may be electrically coupled to the conductors extending through the tray.

BRIEF DESCRIPTION OF THE DRAWINGS

FIG. 1 is a perspective view showing a storage tray secured within a compartment of a utility shell of a pick-up truck with a side of the tray closest the opening of the compartment angled downward.

FIG. 4 is a front view of a clip used to secure a divider panel to sidewalls of the storage tray.

FIG. 5 is a side view of the clip shown in FIG. 4 show secured on a sidewall of the storage tray which is shown in phantom lines.

FIG. 6 is a fragmentary cross-sectional view of the storage tray taken generally along line 6-6 of FIG. 2 with holes formed in the sidewall of the storage tray for mounting lights and a power supply thereto.

FIG. 7 is an exploded, cross-sectional view of the storage tray as shown in FIG. 6.

FIG. 8 is an enlarged and fragmentary perspective view of the tray showing a sidewall with holes formed therein to expose embedded conductors used to supply power from a power supply to a light secured to the sidewall.

FIG. 9 is a greatly enlarged portion of the sidewall having a hole formed therein to expose the conductors.

FIG. 10 is a fragmentary cross-sectional view taken generally along line 10-10 of FIG. 8.

FIG. 11 is an exploded perspective view of a light and a cap used to secure the light in a hole in a sidewall of the tray in contact with conductors embedded therein.

FIG. 12 is a greatly enlarged fragmentary, cross-sectional view take generally along line 12-12 of FIG. 8.

DETAILED DESCRIPTION OF THE PREFERRED EMBODIMENTS

Figure 2:
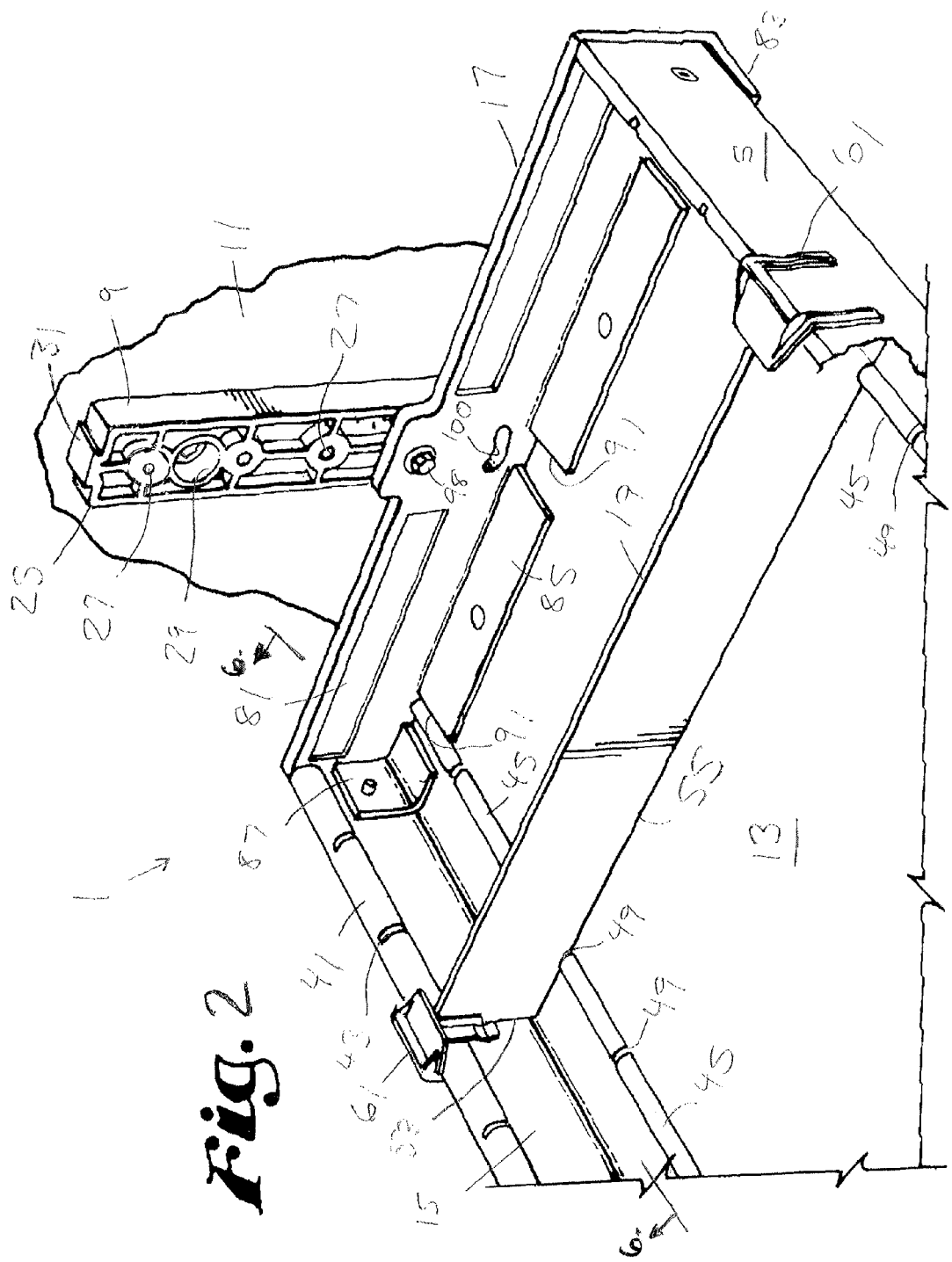
FIG. 2 is an enlarged and fragmentary perspective view showing the storage tray secured to a wall of the compartment using a tray mounting bracket.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to the installed position of the item to which the reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, reference numeral 1 refers to a storage tray assembly for mounting between vertical supports. In the exemplary installation shown in FIG. 1, the storage tray assembly 1 is mounted within a utility compartment 3 of a topper 5 for a pick-up truck 7. The storage tray assembly 1 is supported on brackets 9 secured to end walls 11 of the topper 5. The storage tray assembly 1 comprises a bottom panel 13 and integrally formed sidewalls 15, end caps 17 and dividers or partitions 19.

Each bracket 9 comprises an elongate bracket body or member 25 with a plurality of threaded receivers 27 formed or positioned therein in spaced relationship. In a preferred embodiment the spacing is uniform and may be approximately between 1 to 3 inches apart with a typical spacing of 1½ inches between the centers of the threaded receivers 27. In the embodiment shown the bracket body is formed by injection molding of a glass filed polymer which is molded around the receivers 27. The receivers 27 are molded in place so that the axis through the threaded hole in each receiver extends perpendicular to a longitudinal axis of the bracket body 25. In addition, the receivers 27 are generally aligned along a central or longitudinal axis of the bracket body 25.

At least two mounting holes 29 are also formed in the bracket body 25 during molding. The mounting holes are adapted to receive the stem of a bolt therethrough for bolting the bracket body 25 to a surface such as one of the end walls 11. The brackets 9 may be of a variety of lengths with typical lengths being one foot or two feet long. For a one foot bracket 9, two mounting holes 29 will generally suffice and for a two foot bracket 9, three mounting holes 29 are generally preferred.

The mounting brackets 9 are preferably formed with a dovetail type or tongue and groove type connectors formed at opposite ends to permit coupling of a plurality of brackets 9 together to form a bracket assembly of a desired length or height. In the embodiment shown, a dovetail or tongue type connector 31 is formed at a first end of the bracket 9 and a mating groove 33 is formed in the opposite end of the bracket 9.

As will be discussed in more detail hereafter, the storage tray assembly 1 is secured to the brackets 9 by bolting the end caps 17 to the brackets 9. The bottom 13 and sidewalls 15 of the tray assembly 1, to which the end caps 17 are secured, are formed as an integral piece which may be referred to as the tray body 39. In a preferred embodiment, the tray body 39 is formed through a pultrusion process. In a pultrusion process reinforcing fibers or matting are pulled through a vat of resin and then through a heated die where the resin undergoes polymerization. The pultruded tray body 39 can then be cut to any desired length to form trays of varying length without having to separately form bottom panels and sidewalls of a wide variety of matching lengths.

Longitudinally extending, sidewall ribs 41 are intergrally formed on each sidewall 15 facing inward. The sidewall ribs 41 are preferably formed during the pultrusion process. In a preferred embodiment, the sidewall ribs 41 are formed along or proximate the upper end of the sidewalls 15 and extend the entire length of the tray body 39. The sidewall ribs 41 shown are semi-circular in cross-section or semi-cylindrical in shape to generally form a rounded bead. Vertically oriented slots or divider receiving slots 43 are formed in each sidewall rib 41 in spaced relation along the length of the ribs 41 and in alignment with the slots 43 in the opposite sidewall rib 41. In the embodiment shown, the slots 43 formed in the sidewall ribs 41 are equally spaced. Spacing of the slots 43 may vary for example between 1 inch to 3 inches with a preferred spacing of approximately 1½ inches.

Longitudinally extending, bottom panel ribs or ridges 45 are integrally formed on an upper surface 47 of the tray body 39. The bottom panel ribs 45 are also preferably formed during the pultrusion process. In the embodiment shown there are two bottom panel ribs 45 which extend parallel to and in spaced relation inward from the sidewalls 15. The bottom panel ribs 45 are preferably spaced relatively close to the sidewalls 15 with a spacing of approximately ½ an inch to 1½ inches preferred. The bottom panel ribs 45 shown are semi-circular in cross-section or semi-cylindrical in shape to generally form a rounded bead extending the length of the tray body 39. Divider receiving slots 49 are also formed in each bottom panel rib 45 and extend transverse thereto in alignment with and corresponding spacing to the sidewall slots 43. The sidewall ribs 41 and bottom panel ribs 45 are formed by adding additional roving in the area where the ribs are to be formed to the strands of fibers or matting used to form the tray body 39 prior to pulling the fibers through the vat of resin and through the die.

The dividers 19 generally comprise rigid rectangular panels which may be formed by pultrusion. The dividers 19 are sized to span the width of the tray body 39 which typically ranges from between one to two feet and widths of one foot, fifteen inches and eighteen inches foreseen as being common dimensions. The dividers 19 are sized so that the ends 53 are received in aligned sidewall slots 43 of opposed sidewall ribs 41 and a bottom edge 55 of each divider is received in bottom panel slots 49 aligned with the sidewall slots 43. The dividers 19 are also preferably approximately the same height as the sidewalls 15 of the tray body 39 and a height of approximately 2 inches is foreseen to be a typical height. The bottom panel slots 43 may not extend flush with the upper surface 47 of the bottom panel 13 so that an upper edge 57 of each divider 19 may extend slightly above upper edges of sidewalls 15 of the same height as the dividers 19.

Figure 3:
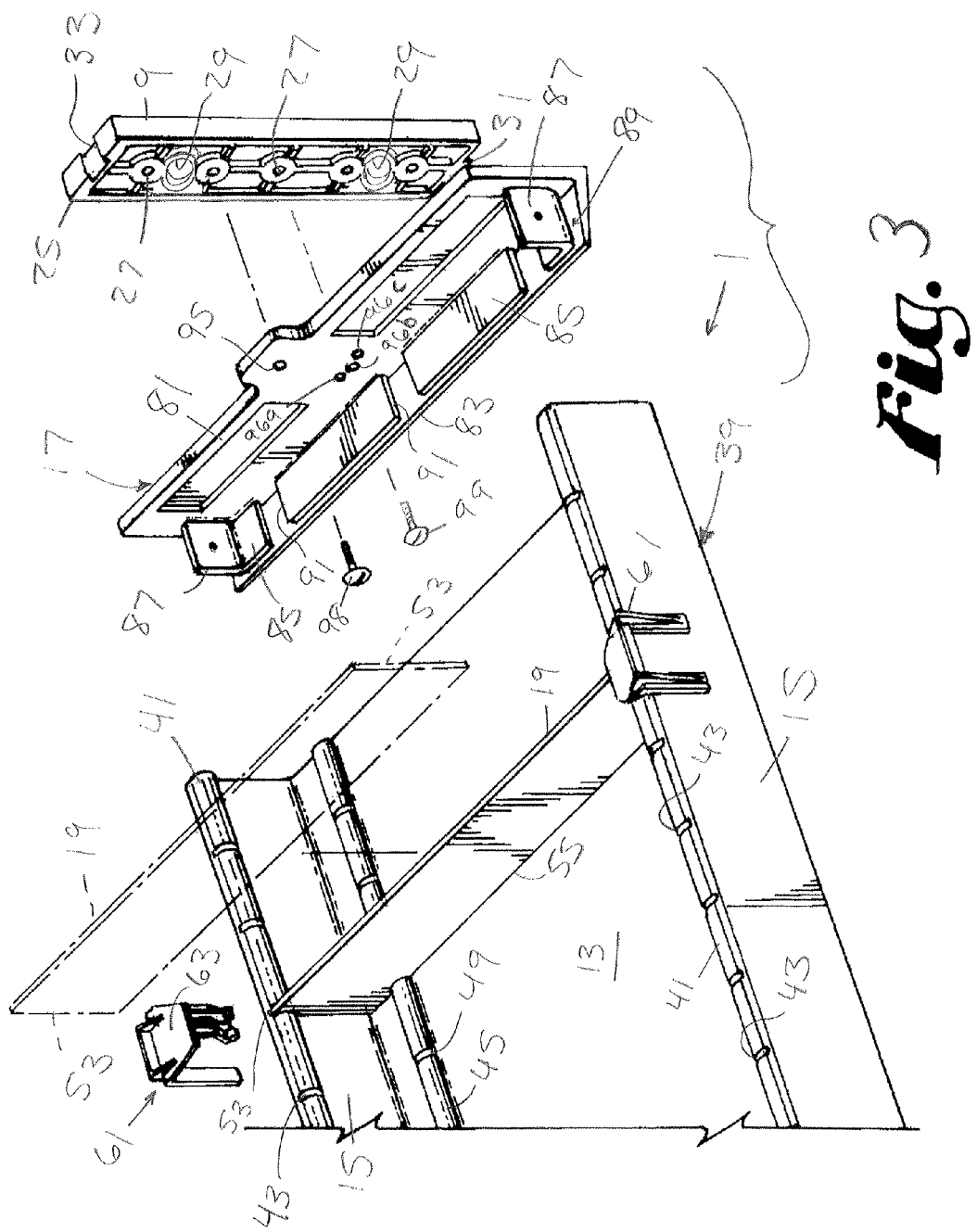
FIG. 3 is an exploded, fragmentary perspective view of an alternative embodiment of the storage tray and mounting bracket as shown in FIG. 2.

Clips 61 may be used to hold the dividers in place in the tray body 39. Each clip 61, as best seen in FIGS. 3-5, includes a clip base or grip 63, a pair of outer legs 65 depending from the clip base 63 and a pair of inner legs or gripping fingers 67 depending from the clip base 63 in spaced relation from the outer legs 65 to form a sidewall receiving gap 69 therebetween. The gripping fingers 67 further extend in spaced apart relation from each other to form a divider receiving gap 71.

The clip base or grip 63 shown is trapezoidal in shape and the outer legs 65 depend from the wider edge of the clip base 63 in spaced apart relation. The outer legs are adapted to be positioned against an outer surface of the sidewall 15 to which it is to be attached to secure a divider 19 in place. It is to be understood that the outer legs 65 could be formed as a single leg, wall or panel depending from the clip base or grip 63.

The clip 61 is preferably formed from a resilient plastic and the inner legs or gripping fingers 67 extend at a slight angle toward the outer legs 65. A barb 73 is formed on a lower or distal end of each gripping finger 67 projecting in the direction of the outer legs 65. Each barb 73 includes lower and upper cam surfaces 75 and 77. The lower cam surface 75 slopes upward and toward the outer legs 65 at an angle of approximately forty-five degrees relative to the clip base 63. The upper cam surface 77 slopes downward and toward the outer legs 65 at an angle of approximately forty-five degrees relative to the clip base 63. The spacing of the sidewall receiving gap 69 between the barbs 73 and the outer legs 65 is sized narrower than the width of the sidewall ribs 41. Above the barbs 73 the sidewall receiving gap 69 widens to approximate or be slightly narrower than the width of the sidewall ribs 41.

The clips 61 are installed by positioning the clip 61 over a sidewall 15 where a divider 19 intersects the sidewall 15 with the outer legs 65 positioned just outside of the outer surface of the sidewall 15 and the gripping fingers extending toward the interior of the tray body 39 on opposite sides of the divider 19 and the lower cam surfaces 75 positioned against an upper surface of the sidewall rib 41. The clip 61 is pressed downward so that the engagement of the lower cam surfaces 75 of gripping fingers 67 against the sidewall rib 41 urges the distal ends of the gripping fingers 67 towards the interior of the tray body 39. Once the barbs 73 pass over the sidewall rib 41, the gripping fingers 67 spring back toward the clip outer legs 65 such that the barbs 73 extend under the sidewall rib 41 to resist removal of the clip 61. Because the sidewall receiving gap 69 is slightly narrower than the sidewall rib 41, the outer legs 65 and gripping fingers 67 press against the rib 41 to further help hold the clip 61 in place relative to the divider. The divider receiving gap 71 formed between gripping fingers 67 is approximately the same width as the divider to firmly secure the divider therebetween.

When a clip 61 is to be removed to reposition a divider 19, the user grasps the clip base or grip 63 and pulls upward. As the upper cam surface 77 of barb 73 on each gripping finger 67 is pulled upward against the bottom of the sidewall rib 41, the barbed end of the gripping finger 74 is urged around the sidewall rib 41 to allow the barb 73 to be pulled past the rib 41.

Referring to FIGS. 2, 3, 6 and 7, the end caps 17 are secured across the ends of the tray body 39 to close off the ends thereof. In the embodiment shown, each end cap includes an end wall 81, bottom mounting flange 83, upper mounting flange 85 and sidewall mounting flanges 87. The bottom mounting flange 83 extends across and projects generally transverse to end wall 81 at a lower end thereof. The upper mounting flange 85 also projects transverse to end wall 81 in closely spaced relation above bottom mounting flange 83 to form a bottom panel receiving gap 89 therebetween. Gap 89 is sized to snugly receive the bottom panel 13 of tray body 39 between flanges 83 and 85. Bottom flange 83 may project from end wall 81 at an angle slightly less than ninety degrees such that the gap 89 between flanges 83 and 85 at the distal ends thereof is narrower than the thickness of the bottom panel 13. The material used to form the end cap 17 is then selected to be sufficiently resilient to allow the mounting flanges 83 and 85 to flex a sufficient amount to allow the bottom panel 13 to be inserted therebetween under compression.

Cutouts or gaps 91 are formed in the upper mounting flange 85 to align with the bottom panel ribs 45 when the end caps 17 are installed on the ends of the tray body 39. The end caps 17 shown include three cutouts 91 to accommodate up to three ribs 45 even though only two ribs are shown in the drawings (see FIG. 2). It is to be understood that the number of bottom panel ribs 45 and corresponding cutouts 91 used could be varied.

The sidewall mounting flanges 87 project generally vertically and transverse to the end wall 81 in inwardly spaced relation to the sides thereof. The sidewall mounting flanges 87 may be formed integral with the upper mounting flange 85. The spacing between the sidewall mounting flanges 87 and the sides of the end wall 81 closely approximates the thickness of the tray sidewalls 15. When the end caps 17 are inserted onto the tray body 39 with the bottom panel received between bottom and upper mounting flanges 83 and 85, the sidewall mounting flanges 87 generally extend against the inner surfaces of sidewalls 15. The end caps 17 may then be secured to the tray body 39 by driving fasteners, such as rivets, through the bottom and upper flanges 83 and 85 and the portion of the bottom panel 45 sandwiched therebetween. Additional fasteners, such as rivets, may be driven through the sidewall mounting flanges 87 and the overlapping portions of the tray body sidewalls 15.

A plurality of bolt holes or slots or both are formed in the end caps 17 near the center thereof to facilitate securing of the tray assembly 1 to brackets 9. In the embodiment shown in FIG. 3, the bolt holes include an upper bolt hole 95 and three lower bolt holes 96a, 96b and 96c all of which preferably are not threaded. The upper bolt hole 95 and the middle, lower bolt hole 96b are aligned along a central, vertical axis of the end cap 81 and are spaced apart on centers a distance corresponding to the distance between centers of the threaded receivers 27 on brackets 9. Lower bolt holes 96a and 96c are also spaced from the upper bolt hole 95 the same distance as central middle, lower bolt hole 96b at a relatively small acute angle from the central, vertical axis of the end cap 81. The lower bolt holes 96a-c may be described as formed along an arc relative to the upper bolt hole 95.

The tray assembly 1 may be mounted transverse to the mounting brackets 9 by inserting a first bolt 98 through the upper bolt hole 95 and then threading the bolt 98 into a first threaded receiver 27 in the bracket 9 and then inserting a second bolt 99 through the middle, lower bolt hole 96b and then threading bolt 99 into a second or next lowest threaded receiver 27 in bracket 9. If the user wants to mount the tray 1 so that one side is angled slightly lower than another to facilitate access to items stored in the tray 1, then after threading the first bolt 98 into bracket 9, the tray can be tilted in the direction desired until bolt hole 96a or 96c is aligned with the next lowest receiver 27. The second bolt 99 is then inserted through the aligned bolt hole 96a or 96c and the receiver 27 and tightened to secure the tray 1 in place at the selected angle. It is foreseen that additional lower bolt holes could be incorporated into end cap 81 to increase the number of angular orientations available or that the lower bolt holes 96 could be replaced by an arcuate slot 100 as shown in FIG. 2, to provide relatively infinite adjustabililty of the angle of the tray 1 relative to the brackets 9.

As best seen in FIGS. 8 and 9, electrical conductors 101 and 102 may be embedded in and run the length of the sidewalls 15. It is also foreseen that conductors could be embedded in the bottom panel 13. The conductors 101 and 102 are preferably flattened and generally form an elongate cuboid. The conductors 101 and 102 carry low voltage DC current to power electrical apparatus such as lighting, speakers, and the like. In the preferred embodiment the conductors 101 and 102 are flattened so that the conductors are taller than they are wide relative to the sidewall 15 in which they are embedded. The wire may also be referred to as a flattened wire or conductor and the wire does not have to be truly rectangular in cross-section. It is to be understood that the wire could have planar, parallel front and rear surfaces with rounded upper and lower edges. It is also foreseen that the wire could have an ovate cross-section. Using flattened wires 101 and 102 reduces the size of any bulges or the like formed by displacement of fiberglass material around the conductors 101 and 102.

Access to the wires for electrically connecting an electrical apparatus thereto is accomplished by forming holes 103 through the sidewall 15 with the holes 103 extending between the two conductors 101 and 102 and exposing a sufficient portion of the conductors 101 and 102 to form an electrical connection thereto with conductors on the apparatus to be installed. The apparatus to be installed may include lights 105 of the type disclosed in my prior U.S. Pat. No. 7,810,277, the disclosure of which is incorporated herein by reference.

Electrical wires or leads 107 and 108 are connected between a power supply 111 and the conductors 101 and 102 respectively using a power supply clip 113 and cap 114 (see FIG. 11) assembly similar to that shown in U.S. Pat. No. 7,810,277. When used in a vehicle, the low voltage, vehicle battery may be used as the power supply 111. If the tray 1 is used in a location where only high voltage power is available, a transformer, not shown, would be used to step down the voltage.

The power supply clip 113, as shown in FIG. 8, includes a plug or plug shaft 117 and a face plate or plug flange 118 sized for insertion in one of the holes 103 to frictionally engage the portion of the sidewall 15 surrounding the hole 103. The plug 117 is generally square in cross-section. Two bores 123 and 124 extend through the face plate 118 and plug 117 of clip 113.

An exposed portion of each lead 107 and 108 is bent back over and across an outer surface of the plug 117 and preferably at least up to a rear surface 130 of the face plate 118. The plug 117 is inserted in one of the holes 103 with the plug 117 oriented so that the exposed ends of leads 107 and 108 engage the conductors 101 and 102 so that the exposed ends of the leads 107 and 108 are pressed against and held in electrical contact with the conductors 101 and 102.

One of the caps 114 (of the type shown in FIGS. 10-12) is securable over the end of the plug 117 to help further secure the clip 113 in place on the sidewall 15. The cap 114 used for the power supply clip 113 may also be used for securing the lights 105 to the sidewall 15. Reference is therefore made to the drawings showing the lights 105 for details regarding the caps 114. Each cap 114 includes a receiver 133 which is square in cross-section and sized to receive the plug 117 in a friction fit. It is to be understood that a wide variety of other means could be utilized to connect electrical leads to the conductors 101 and 102 to supply electricity thereto. For example, the electrical connection may be made at the end of each tray sidewall 15.

The lights 105, an example of which is best seen in FIGS. 11-12, are constructed in a fashion similar to the clip 113. Each light 105 includes a body 135 including a plug or plug shaft 137 which projects rearwardly from a face plate or flange 138. The plug 137 is sized for insertion in one of the holes 103 to frictionally engage the portion of the sidewall 15 surrounding the hole 103. The plug 137 is generally square in cross-section and includes a base 139 with a pair of rearwardly projecting legs or prongs 140 separated by a groove 141. Two bores 143 and 144 extend through the face plate 138 and plug 137 of light body 135. The bores 143 and 144 extend through base 139 of the plug 137 and open into the groove 121.

A bulb socket 146 is formed on faceplate 138 on a side opposite the plug 137, a light bulb 147 is secured within the socket 146 and a lens 148 covers the bulb 147 and socket 146. Electrical leads 149 and 150 extend from the light bulb 147 and through bores 151 and 152 in the in the face plate 138 and plug shaft 137 and back around sides of the plug 137 for engagement with the electrical conductors 101 and 102 when the plug 137 is inserted in one of the holes 103 in sidewall 15. An exposed portion of each lead 149 and 150 is bent back over and across an outer surface of the plug base 139 and at least up to a rear surface 154 of the face plate 138. The plug 137 is inserted in one of the holes 103 with the plug 137 oriented so that the exposed electrical leads 149 and 15 engage the conductors 101 and 102 to form an electrical contact with the conductors 101 and 102.

A cap 114 is securable over the end of the plug 137 of each light 105 to help further secure the lights 105 in place on the sidewall 15. The cap 114 receiver 133 is sized to receive the plug 137 in a friction fit. The plug 137 preferably includes a groove 155 formed along the side of one of the legs 140. A mating guide or tongue 157 is formed in the cap receiver 133. The tongue 157 in cap receiver 133 extends into the aligned groove 155 formed in the leg 140 of plug 137 in a friction fit to further assist in securing the cap 114 to the plug 137.

The lightbulb 147 may be of a variety of types including incandescent or LED. The shape of the socket 146 and lens 148 may also vary and it is foreseen that the light could be mounted above the tray 1, with flexible leads connected to conductors 101 and 102 through a clip such as clip 113 or through a rigid mount.

It is to be understood that while certain forms of the present invention have been illustrated and described herein, it is not to be limited to the specific forms or arrangement of parts described and shown.

Having thus described the invention, what is claimed as new and desired to be secured by this patent is as follows:

1. A tray comprising:
   a body having a bottom and at least two sidewalls integrally formed with said bottom, said bottom being generally flat and said sidewalls extending upwardly from said bottom;
   a ridge integrally formed with and extending upwardly from said bottom; said ridge extending in parallel relation to and between said sidewalls; and
   a partition for partitioning said interior compartment into sub-compartments, a bottom edge of said partition receivable in a slot formed in said ridge; and
   an end cap securable across each end of said body to close off said end; each said end cap comprising an end wall, a lower mounting flange extending across and projecting transverse to said end wall and an upper mounting flange projecting transverse to said end wall in spaced relation above said lower mounting flange to form a gap therebetween sized to snugly receive said bottom of the body of the tray.

2. The tray as in claim 1 in combination with at least one bracket for mounting said tray on a wall at least one of said end caps having a mounting hole extending through said end wall along a central, vertical axis thereof, said bracket having a plurality of threaded receivers mounted therein for receiving a threaded fastener inserted through the mounting hole in the end wall of said tray and into said bracket to permit positioning of said tray at vertically selectable levels.

3. The tray as in claim 1 wherein said pair of electrical conductors are embedded in and extend the length of one of said sidewalls.

4. A tray comprising:
   a body having a bottom and at least two sidewalls integrally formed with said bottom, said bottom being generally flat and said sidewalls extending upwardly from said bottom;
   a ridge integrally formed with and extending upwardly from said bottom; said ridge extending in parallel relation to and between said sidewalls; and
   a partition for partitioning said interior compartment into sub-compartments, a bottom edge of said partition receivable in a slot formed in said ridge
   a pair of electrical conductors embedded in and extending the length of said tray body.

5. The tray as in claim 4 further comprising an electrical apparatus mounted to said tray and electrically coupled to said electrical conductors.

6. The tray as in claim 4 further comprising an electrically powered light mounted to said tray and electrically coupled to said electrical conductors.

7. The tray as in claim 4 wherein said electrical conductors are removably couplable to a power supply comprising a battery.

8. The tray as in claim 4 wherein:
   said body and said ridge are formed as a single integral piece of material made from fiber reinforced polymerized resin in which said electrical conductors are embedded.

9. A utility compartment tray assembly including a tray and at least one mounting bracket;
   said tray comprising:
      a body having a generally flat bottom and at least two walls, said walls integrally formed with said bottom, said walls extending upwardly from said bottom to form an interior compartment;
      a ridge integrally formed with said bottom, said ridge extending upwardly from said bottom and located between said walls;
      said body and said ridge formed from a fiber reinforced polymerized resin;
      a partition for partitioning said interior compartment into sub-compartments, said partition receivable in a slot formed in said ridge, said partition securable to said body by removable clips;
      an end cap securable across each end of said body to close off said end;
   said at least one mounting bracket having a plurality of receivers formed therein and securable to a wall with said plurality of receivers extending in vertically spaced alignment;
   said tray further comprising means on said end cap for removable securing said end cap to a selected one of said receivers to permit selective vertical positioning of said tray relative to said bracket.

10. The tray assembly as in claim 9 further comprising means on said end cap for selectively securing said tray to said at least one bracket at one of a plurality of angles relative thereto.

11. A tray assembly comprising:
   a tray body having a bottom and at least two sidewalls integrally formed with said bottom, said bottom being generally flat;
   a ridge integrally formed with and extending upwardly from said bottom; said ridge extending in parallel relation to and between said sidewalls;
   a partition for partitioning said interior compartment into sub-compartments, a bottom edge of said partition receivable in a slot formed in said ridge;
   a bracket for mounting said tray body on a wall, said bracket having a plurality of threaded receivers mounted therein for receiving a threaded fastener; and
   at least two end caps secured across opposite ends of said tray body, at least one of said end caps securable to said bracket, said threaded fastener extending through said end cap securable to said bracket and into said bracket to permit positioning of said tray body at vertically selectable levels, said end caps each having an upper bolt hole formed through said end cap and a plurality of lower bolt holes formed through said end cap below and in equally spaced relation from said upper bolt hole and wherein said spacing between said upper bolt hole relative to said lower bolt holes corresponds to the spacing between adjacent threaded receivers in said bracket.

12. A tray assembly comprising:
a tray body having a bottom and at least two sidewalls integrally formed with said bottom, said bottom being generally flat;
a ridge integrally formed with and extending upwardly from said bottom; said ridge extending in parallel relation to and between said sidewalls;
a partition for partitioning said interior compartment into sub-compartments, a bottom edge of said partition receivable in a slot formed in said ridge;
a bracket for mounting said tray body on a wall, said bracket having a plurality of threaded receivers mounted therein for receiving a threaded fastener; and
at least two end caps secured across opposite ends of said tray body, at least one of said end caps securable to said bracket, said threaded fastener extending through said end cap securable to said bracket and into said bracket to permit positioning of said tray body at vertically selectable levels, said end caps each having an upper bolt hole formed through said end cap and an arcuate slot formed through said end cap below said upper bolt hole and wherein said spacing between said upper bolt hole relative to said arcuate slot corresponds to the spacing between adjacent threaded receivers in said bracket.

13. A tray comprising:
a body formed from a fiber reinforced polymer resin and having a bottom and at least two sidewalls integrally formed with said bottom, said bottom being generally flat and said sidewalls extending upwardly from said bottom:
a pair of electrical conductors embedded in the fiber reinforced polymer resin forming said body and extending the length of said body, wherein the pair of electrical conductors are embedded in one of the sidewalls.

14. A tray comprising:
a body formed from a fiber reinforced polymer resin and having a bottom and first and second sidewalls integrally formed with said bottom, said bottom being generally flat and said first and second sidewalls extending upwardly from said bottom;
a first pair of electrical conductors embedded in the fiber reinforced polymer resin forming said first sidewall of said body and extending the length of said first sidewall, and a second pair of electrical conductors embedded in said second sidewall and extending the length of said second sidewall.

* * * * *